(No Model.)

C. F. HADLEY.
BICYCLE.

No. 331,295. Patented Dec. 1, 1885.

WITNESSES:
Charles L. Brown Jr.
Henry G. Hitchkin.

INVENTOR
Charles F. Hadley.
BY Geo. W. Seymour
ATTORNEY

UNITED STATES PATENT OFFICE.

CHARLES F. HADLEY, OF CHICOPEE, ASSIGNOR TO THE OVERMAN WHEEL COMPANY, OF BOSTON, MASSACHUSETTS.

BICYCLE.

SPECIFICATION forming part of Letters Patent No. 331,295, dated December 1, 1885.

Application filed June 22, 1885. Serial No. 169,476. (No model.)

*To all whom it may concern:*

Be it known that I, CHARLES F. HADLEY, residing at Chicopee, in the county of Hampden and State of Massachusetts, have invented certain new and useful Improvements in Bicycles; and I do declare the following to be a full, clear, and exact description of the same, reference being had to the accompanying drawings, which form a part of this specification.

My invention relates to an improvement in the construction of the handle-bars and steering-heads of velocipedes, the object being to improve the former, and to provide for a stiff, compact, and simple connection between them and the steering-heads, and for their ready removal from and replacement upon the same.

With these ends in view my invention consists in a handle-bar having a split ring provided with lugs receiving a tap-bolt, and adapted to be clamped upon the steering-head of a velocipede.

My invention further consists in a handle-bar having a split ring provided with lugs carrying a tap-bolt, and a steering-head having an elliptical bearing upon which the split ring of the bar is clamped.

My invention further consists in a handle-bar having a collar, studs projecting from opposite faces thereof, and tubular handle-sections secured to the said studs.

My invention further consists in certain details of construction, as will be hereinafter described, and pointed out in the claims.

Figure 1:
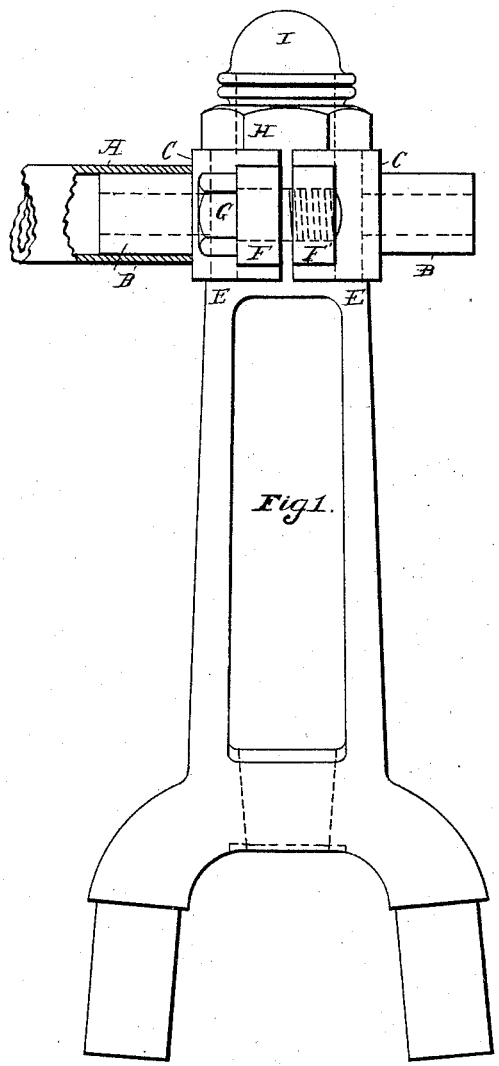
Figure 2:
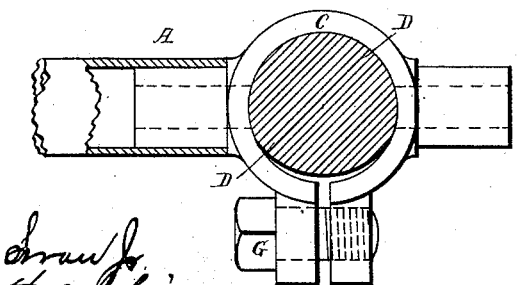

In the accompanying drawings, Figure 1 is a view, partly in elevation and partly in section, of a handle-bar and steering-head embodying my invention and Fig. 2 is a plan view thereof with the cap and nut removed, and with the steering-head and a part of the bar in section.

As herein shown, the handle-bar consists of a split ring or collar, C, provided with lugs F and F', carrying a tap-bolt, G, studs B B, projecting from opposite faces of the ring or collar, and tubular handle-sections or arms A A, secured to the said studs, and located in line with the ring or collar. The steering-head E is provided with an elliptical bearing, D, a nut, H, and, as shown, with a cap, I, which is located above the nut. Connection between the said handle-bar and steering-head is made by clamping the split ring or collar of the former upon the elliptical bearing of the latter by means of the tap-bolt, whereby the bar is prevented from turning upon the head, and then screwing the nut of the steering-head down upon the upper edge of the split ring or collar. The connection so formed is rigid, the construction simple and compact, and the bar may be easily removed and replaced as occasion may require.

Having fully described my invention, what I claim as new, and desire to secure by Letters Patent, is—

1. In a velocipede, a handle-bar having a split ring provided with lugs carrying a tap-bolt, and adapted to be clamped upon the steering-head of the vehicle, substantially as set forth.

2. In a velocipede, a handle-bar having a split ring or collar provided with lugs carrying a tap-bolt, and a steering-head having an elliptical bearing upon which the split ring or collar of the box is clamped, substantially as set forth.

3. In a velocipede, a handle-bar having a collar, studs projecting from opposite faces thereof, and tubular handle-sections or arms secured to the said studs, substantially as set forth.

4. In a velocipede, a handle-bar having a split ring or collar provided with lugs carrying a tap-bolt, studs projecting from opposite faces of the said split ring or collar, and tubular handle-sections or arms secured to the studs, and a steering-head having an elliptical bearing upon which the split ring or collar of the bar is clamped, substantially as set forth.

5. In a velocipede, a handle-bar having a split ring provided with lugs carrying a tap-bolt, and adapted to be clamped upon the steering-head of the vehicle, and a nut connected with such steering-head and screwed down upon the upper edge of the split ring, substantially as set forth.

In testimony whereof I have signed this specification in the presence of two subscribing witnesses.

CHARLES F. HADLEY.

Witnesses:
R. D. GARDEN,
LUTHER WHITE.